UNITED STATES PATENT OFFICE.

FRITZ BENDER, OF FRANKFORT-ON-THE-MAIN, ASSIGNOR TO A. LEONHARDT & CO., OF MÜHLHEIM-ON-THE-MAIN, GERMANY.

PRODUCTION OF COLORING-MATTER.

SPECIFICATION forming part of Letters Patent No. 396,527, dated January 22, 1889.

Application filed April 12, 1888. Serial No. 270,455. (No specimens.)

*To all whom it may concern:*

Be it known that I, Dr. FRITZ BENDER, of Frankfort-on-the-Main, in the Empire of Germany, have invented new and useful Improvements in Coloring-Matter, of which the following is a specification.

My invention relates to the production of a new coloring-matter for dyeing cotton, wool, and silk by the action of caustic alkalies upon paranitrotoluol sulpho-acid in presence of oxidable substances of mineral or organic nature, such as methyl alcohol, ethyl alcohol, glycerine, aromatic phenols, or their carbonic or sulphuric acids, &c.

In carrying out my process practically I take paranitrotoluolsulpho-acid or a salt of the said acid and dissolve or diffuse it in water or alcohol or glycerine, &c., and add caustic soda-lye together with an oxidable substance and boil the obtained mixture until the coloring-matter is formed. Of course, in lieu of one oxidable substance, two or more may be employed in combination.

The obtained dye-stuff is isolated or purified in the way well known to chemists.

The dye-stuff obtained forms a brownish powder, which, if dissolved in water, gives a yellowish solution, the color being scarcely altered by the addition of caustic soda-lye and dissolving in concentrated sulphuric acid with a reddish or bluish violet color. The watery solution, when treated with chloride of barium, yields a brownish-red precipitate, while when boiled with caustic soda-lye and zinc-dust a colorless solution is obtained, which in presence of air again assumes an intensely-red color.

By complete reduction new products are obtained, among which diamidostilbendisulpho-acid of the same qualities as described in Letters Patent No. 360,553 is the most remarkable, (showing that with regard to the Patent No. 360,553 the dye-stuff herein claimed proves to be an equivalent to the red product of condensation obtained as an intermediate product when manufacturing diamidostilbendisulpho-acid from paranitrotoluol.)

The dye-stuff dyes cotton without any mordant in a boiling bath best with common salt, and yields a full series of shades depending upon the nature of the oxidable agent employed, (inorganic oxidable substances producing shades of a more yellow character, while organic ones give shades of a more red or brown character,) the deepness of the shade depending, also, in a manner upon the shorter or longer duration of the boiling at the process of manufacturing the color.

The said coloring-matter is faster against alkalies or soaps than any before-known dye-stuff capable of dyeing cotton without a mordant.

Having thus described my invention and the manner of employing the same, what I claim, and wish to secure by Letters Patent of the United States of America, is—

The coloring-matter herein described, which is produced by the action of caustic alkalies upon paranitrotoluol sulpho-acid in presence of water, alcohol, or glycerine with an oxidable substance, and which is a brownish powder, giving, when dissolved in water, a yellowish solution the color of which is scarcely altered by the addition of caustic soda-lye, dissolving in concentrated sulphuric acid with a violet color, and the watery solution of which, when heated with a chloride of barium, yields a brownish-red precipitate, and when boiled with caustic soda-lye and zinc-dust gives a colorless solution which in presence of air assumes an intensely-red color, substantially as herein specified.

In testimony whereof I have signed my name to this specification in the presence of two subscribing witnesses.

FRITZ BENDER.

Witnesses:
 FRANZ HASSLACHER,
 JOSEPH PATRICK.